Jan. 16, 1945.    J. A. MAUL    2,367,596
DYNAMOMETER TEST SYSTEM
Filed Jan. 5, 1944

Inventor:
John A. Maul,
by Harry E. Dunham
His Attorney.

Patented Jan. 16, 1945

2,367,596

UNITED STATES PATENT OFFICE 2,367,596

DYNAMOMETER TEST SYSTEM

John A. Maul, Fort Wayne, Ind., assignor to General Electric Company, a corporation of New York Application January 5, 1944, Serial No. 517,077

9 Claims. (Cl. 73—116)

My invention relates to test systems and particularly to the type which is adapted to utilize a dynamometer which supplies power to a controllable load.

An object of my invention is to provide an improved electrical dynamometer test system.

Another object of my invention is to provide an electrical test system in which the load is substantially simultaneously varied in a predetermined relationship to the speed of the prime mover.

Further objects and advantages of my invention will become apparent and my invention will be better understood from the following description referring to the accompanying drawing and the features of novelty which characterize my invention will be pointed out with particularity in the claims annexed to and forming a part of this specification.

Figure 1:
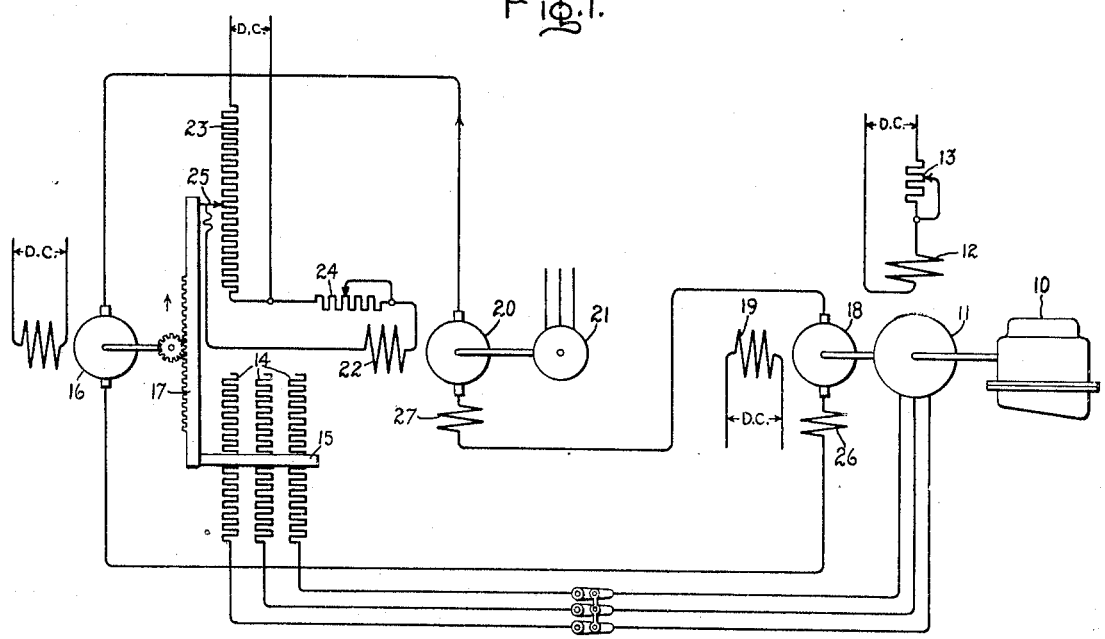
Figure 2:
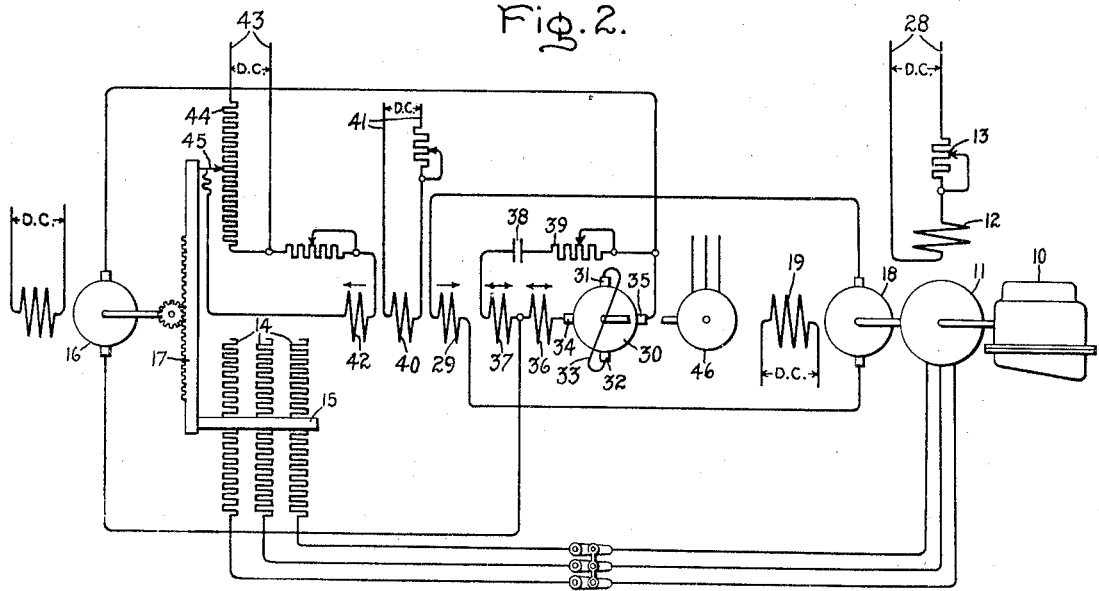

In the drawing, Fig. 1 is a schematic illustration of an electrical test system embodying my invention; and Fig. 2 is a schematic illustration of a modification of the electrical test system shown in Fig. 1.

Referring to the drawing, I have shown an electrical test system for testing a prime mover 10 by connecting it to a three-phase inductor generator 11 constructed as a dynamometer and having a control field 12 which may be energized in any suitable manner and also controlled as desired by a suitable circuit as by a field rheostat 13. The load on the three-phase generator 11 is provided by a suitable three-phase resistor 14 which may be in the form of a water barrel with a common or connected neutral formed by a suitable conductor 15 adapted to be varied by a driving motor 16 through a suitable gearing as a gear rack 17. For certain types of prime movers, such as internal combustion engines, it is necessary that the load resistance of the inductor generator be varied with the speed in order to produce a torque-speed characteristic which will be stable. Stability in testing is obtained when the increase in torque for a given increase in speed of the unit absorbing power is greater than that of the driving unit. In my improved test system, this is obtained by balancing a speed responsive voltage against a load current responsive voltage to maintain a predetermined relationship between the absorbed load power as varied by the load resistance in this case and the speed of the prime mover. The speed responsive voltage is obtained from an unsaturated generator arranged as a tachometer having an armature 18 driven at a speed proportional to the speed of the main inductor generator 11 and the speed of the engine 10. This tachometer generator is provided with a field exciting winding 19 which may be excited from any suitable source of constant potential direct current, and the armature is connected in series with the second source of voltage which is substantially responsive to the inductor generator load resistance. This second source of voltage in this system comprises a D. C. generator having an armature 20 adapted to be driven at substantially constant speed by any suitable constant speed motor 21 and is provided with a field exciting winding 22 arranged to be energized by a suitable source of direct current connected across a variable potentiometer 23. The basic voltage of this generator may be controlled manually by a field rheostat 24 and the variable component of its voltage is obtained by varying the voltage across the field exciting winding 22 across the potentiometer 23. This is obtained by connecting the field exciting winding 22 through a movable contactor 25 which is actuated by the load controlling motor 16 and the gear rack 17 which is driven by this motor, such that the position of the contactor 25 corresponds to the position of the load varying conductor 15 and increases or decreases the energizing voltage applied to the field exciting winding 22 in accordance with corresponding variations in the absorbed load power by the load resistance 14 of the main generator 11. Thus, for any given speed of the prime mover 10, the voltage on the load resistance controlling motor 16 will depend on the difference between the voltages generated by the tachometer generator 18 and the constant speed controllable voltage generator 20, such that for any given speed of the prime mover 10, the motor 16 will operate in one direction or the other, depending upon whether the voltage of the generator 18 or of the generator 20 is higher and will vary the voltage across the control field exciting winding 22 of the controllable voltage generator 20 until the voltage of this generator is equal and opposite to the voltage of the tachometer generator 18. Thus, for each different speed of the prime mover 10 and the main generator 11, the load resistance 14 will be varied by the conductor 15 until the voltage across the control motor 16 is substantially zero, and for each speed of the prime mover, there will be a corresponding load position for the motor 16 and, therefore, a corresponding load will be placed on the generator 11 and the prime mover 10. A series field exciting winding 26 is arranged to provide a component of excitation to the speed responsive generator 18 which will cause the voltage of this generator to become further different, either higher or lower, from the voltage of the generator 20. This latter generator also is provided with a series field exciting winding 27 arranged to provide a component of excitation to the generator 20 which also will cause a greater difference between the voltages of this generator and the generator 18 to provide a quicker response to the system.

In Fig. 2, I have shown another embodiment of my invention in which the speed responsive and load resistance responsive voltages are applied to control field exciting windings of a single generator, and this generator supplies the driving power to the load controlling motor. As in the arrangement shown in Fig. 1, a prime mover 10 is arranged to drive a three-phase inductor generator arranged as a dynamometer for measuring the load on this prime mover. This three-phase generator 11 is connected to a suitable three-phase load 14 which may be varied by a suitable interconnecting conductor 15 adapted to be operated by a control motor 16 through suitable gearing connected to a gear rack 17. The main generator is provided with a field exciting winding 12 which may be manually controlled by a rheostat 13 connected to a suitable source of direct current 28. A tachometer generator having an armature 18 and a field exciting winding 19 or permanent magnet field is adapted to operate as an unsaturated generator for providing a voltage substantially responsive to the speed of the main generator 11 and the prime mover 10. This speed responsive voltage is applied to a field exciting winding 29 of a composing generator in the form of an amplidyne machine having an armature 30 and adapted to provide power to the load controlling motor 16. The amplidyne is provided with a set of primary brushes 31 and 32 which are short circuited by a conductor 33 to provide a primary circuit through the amplidyne generator armature and is provided with a set of secondary or load brushes 34 and 35 displaced substantially 90 electrical degress about the commutator from the primary brushes 31 and 32. These secondary or load brushes are adapted to be connected to the load controlling motor 16 through a compensating field exciting winding 36 which is arranged substantially to neutralize the secondary component of armature reaction due to secondary or load current in the armature 30. The amplidyne also is provided with a field exciting winding 37 connected through a capacitor 38 and a variable resistance 39 across the armature 30 and adapted to provide a component of excitation to the machine in opposition to any transient variations in the machine so as to stabilize operation of the amplidyne. A main or basic field exciting winding 40 also is arranged to provide a component of excitation along the secondary commutating axis of the amplidyne and is adapted to be energized by a suitable source of direct current 41. The field exciting windings 29, 36, 37, and 40 provide the amplidyne with an excitation which is variable in accordance with variations in the speed of the prime mover 10 and the main generator 11. This amplidyne generator is adapted to compose or combine this speed responsive voltage with a load responsive component of voltage induced in the armature 30 by a field exciting winding 42 which is connected across a suitable source of electrical power supply 43 by a potentiometer 44 which is adapted to be varied by the load controlling motor 16 through the gear rack 17 which is arranged to operate a contactor 45 on the potentiometer. This provides an energizing voltage across the field exciting winding 42 which varies in accordance with variations in the load provided by the resistance 14 on the main generator 11. The field exciting winding 42 is arranged to provide a component of excitation in opposition to the component of excitation provided by the speed responsive field exciting winding 29, such that the resultant voltage produced by the armature 30 will be substantially zero when the load 14 on the main generator 11 bears a predetermined relationship to the speed of this machine. In order to provide this desired relationship between the various field exciting windings of the amplidyne generator, this machine is operated as an unsaturated machine and is driven by a substantially constant speed motor 46. In some instances, this second system may be found more desirable as it provides a more flexible control and more rapid response to variations in the speed of the main machine 11 and variations in the adjustment of the load resistance due to the inherent rapid response characteristics of amplidyne generators.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An electrical system for testing a prime mover including a main generator arranged as a dynamometer adapted to be driven by the prime mover, means for providing a component of voltage responsive to the speed of said main generator, a controllable component of voltage source, a load connected to said main generator, means including a motor for simultaneously varying the voltage of said controllable component of voltage source and for varying the absorbed power of said load on said main generator, and means for energizing said motor by the voltage difference between said speed responsive component of voltage and the voltage of said controllable component of voltage source for varying the absorbed power of said load in a predetermined relationship to the speed of said main generator.

2. An electrical system for testing a prime mover including a main generator arranged as a dynamometer adapted to be driven by the prime mover, means for providing a voltage responsive to the speed of said main generator, a controllable voltage source, a load connected to said main generator, means including a motor for simultaneously varying the voltage provided by said controllable voltage source and for varying the absorbed power of said load on said main generator, and means connecting said speed responsive voltage in opposition to said controllable voltage source and to said motor for energizing said motor by the voltage difference therebetween for varying the absorbed power of said load in a predetermined relationship to the speed of said main generator.

3. An electrical system for testing a prime mover including a main generator arranged as a dynamometer adapted to be driven by the prime mover, means for producing a voltage responsive to the speed of said main generator, a second source of voltage, means for controlling said second source of voltage, a load connected to said main generator, means for simultaneously varying said second source of voltage and for varying the absorbed power of said load on said main generator, and means for energizing said simultaneously varying means by a voltage variable in accordance with the difference in voltage between said speed responsive voltage and said controllable second source of voltage for varying the absorbed power of said load in a predetermined relationship to the speed of said main generator.

4. An electrical system for testing a prime mover including a main generator arranged as a dynamometer adapted to be driven by the prime mover, means for producing a voltage responsive to the speed of said main generator, a second source of voltage, means for controlling said second source of voltage, a load connected to said main generator, means including a motor for simultaneously varying said second source of voltage and for varying the absorbed power of said load on said main generator, and means for energizing said motor by a voltage variable in accordance with the difference between the speed responsive voltage and the voltage of said controllable second source of voltage for varying the absorbed power of said load in a predetermined relationship to the speed of said main generator.

5. An electrical system for testing a prime mover including a main generator adapted to be driven by the prime mover, a load connected to said main generator, a controllable voltage generator, means including a field exciting winding for providing a component of excitation to said controllable voltage generator responsive to the speed of said main generator, means including a second field exciting winding for providing a controllable component of excitation to said controllable voltage generator, means including a motor for simultaneously varying the energization of said second field exciting winding of said controllable voltage generator and for varying the absorbed power of said load on said main generator, and means for energizing said motor by said controllable voltage generator for varying the absorbed power of said load in a predetermined relationship to the speed of said main generator.

6. An electrical system for testing a prime mover including a main generator arranged as a dynamometer adapted to be driven by the prime mover, means including a tachometer generator arranged for producing a voltage responsive to the speed of said main generator, a controllable voltage generator, means for driving said controllable voltage generator at substantially constant speed, means including a field exciting winding for controlling the voltage of said controllable voltage generator, means for manually varying the energization of said field exciting winding, a load connected to said main generator, means including a motor for simultaneously varying the energization of said controllable voltage generator field exciting winding and for varying the absorbed power of said load on said main generator, and means connecting said tachometer generator in opposition to said controllable voltage generator and to said motor for varying the absorbed power of said load in a predetermined relationship to the speed of said main generator.

7. An electrical system for testing a prime mover including a main generator adapted to be driven by the prime mover, a load connected to said main generator, a controllable voltage generator, means for driving said controllable voltage generator at substantially constant speed, a field exciting winding for said controllable voltage generator, means for controlling the energization of said field exciting winding in response to the speed of said main generator, a second field exciting winding for said controllable voltage generator, means including a motor for simultaneously varying the energization of said second field exciting winding of said controllable voltage generator and for varying said load on said main generator, and means for energizing said motor by said controllable voltage generator for varying the absorbed power of said load in a predetermined relationship to the speed of said main generator.

8. An electrical system for testing a prime mover including an inductor generator arranged as a dynamometer adapted to be driven by the prime mover, a tachometer generator arranged to be driven at a speed responsive to the speed of said inductor generator, a controllable voltage generator, means for driving said controllable voltage generator at substantially constant speed, a field exciting winding for said controllable voltage generator, a load, means for connecting said load to said inductor generator, means including a motor for simultaneously varying the energization of said controllable voltage generator field exciting winding and for varying the absorbed power of said load on said inductor generator, and means for connecting said tachometer generator in opposition to said controllable voltage generator for energizing said motor by the difference in the voltages therebetween whereby the absorbed power of said load is varied in a predetermined relationship to the speed of said inductor generator.

9. An electrical system for testing a prime mover including a polyphase inductor generator arranged as a dynamometer adapted to be driven by the prime mover, a tachometer generator arranged to be driven at a speed responsive to the speed of said inductor generator, a controllable voltage generator, means for driving said controllable voltage generator at substantially constant speed, a field exciting winding for said controllable voltage generator, means for manually varying the energization of said field exciting winding, a three-phase load, means for connecting said three-phase load to said inductor generator, means including a motor for simultaneously varying the energization of said controllable voltage generator field exciting winding and for varying the absorbed power of said three-phase load on said inductor generator, and means for energizing said motor by a voltage variable in accordance with the difference between the speed responsive voltage and the voltage of said controllable voltage generator whereby the absorbed power of said load is varied in a predetermined relationship to the speed of said inductor generator.

JOHN A. MAUL.